Dec. 17, 1935.  A. L. FREEDLANDER  2,024,443
BELT
Original Filed Feb. 12, 1934   4 Sheets-Sheet 1

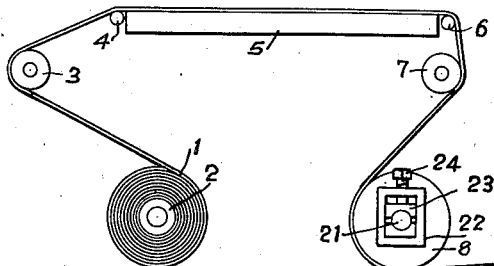

Fig. 1.

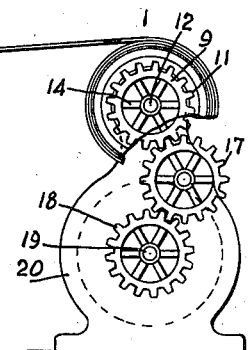

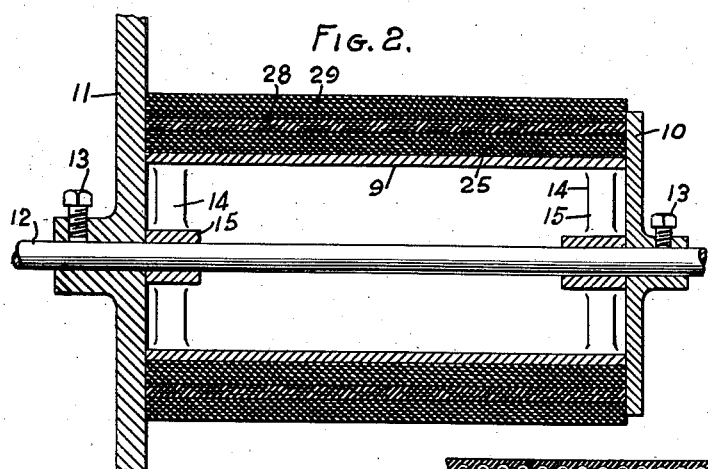

TENSION SECTION 29
STRAIGHT LAID
COMPRESSION SECTION
BIAS LAID FABRIC  28

INNER COVER 31
BIAS LAID FABRIC  25
TOOTHED SECTION
STRAIGHT LAID FABRIC

Fig. 4.

32 - BIAS LAID FABRIC
29 - TENSION SECTION STRAIGHT LAID FABRIC.
30 - NEUTRAL AXIS LAYER.
COMPRESSION SECTION BIAS LAID FABRIC
28
25 TOOTHED SECTION STRAIGHT LAID FABRIC.
31 INNER COVER BIAS LAID FABRIC
32 OUTER COVER BIAS LAID FABRIC
31-32 BIAS LAID FABRIC.

Inventor
ABRAHAM L. FREEDLANDER,
BY
Toulmin & Toulmin
Attorneys

Dec. 17, 1935.   A. L. FREEDLANDER   2,024,443
BELT
Original Filed Feb. 12, 1934    4 Sheets-Sheet 2
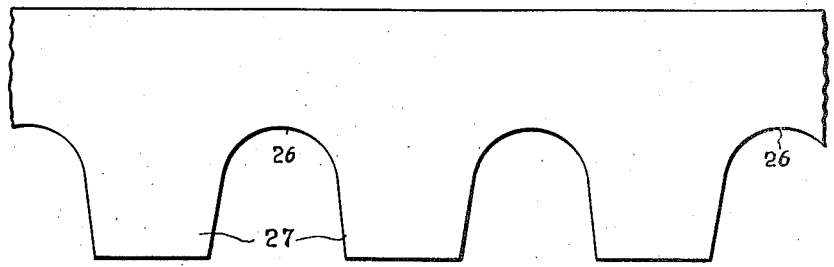
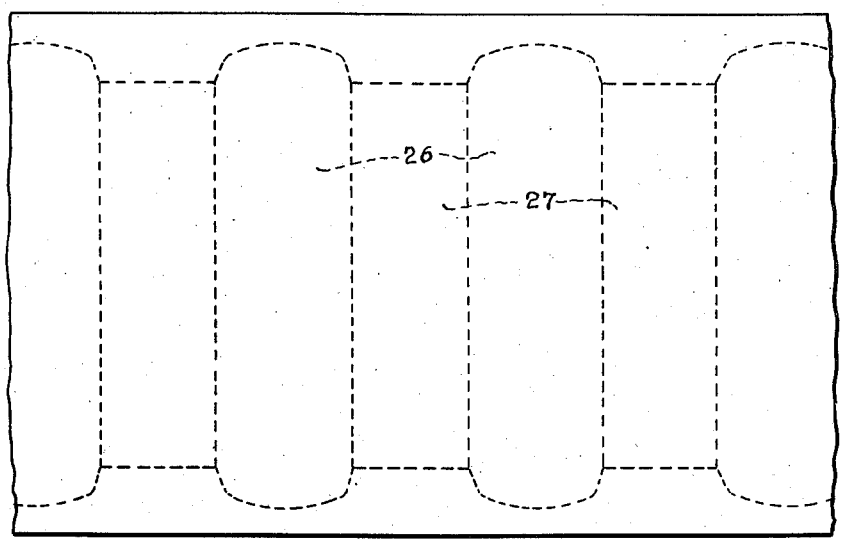
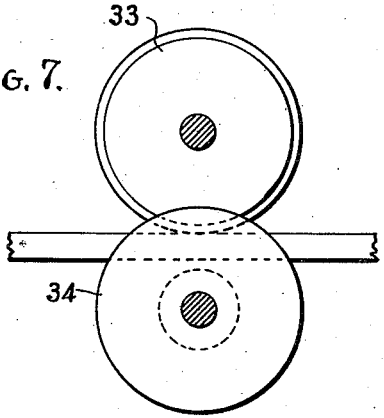
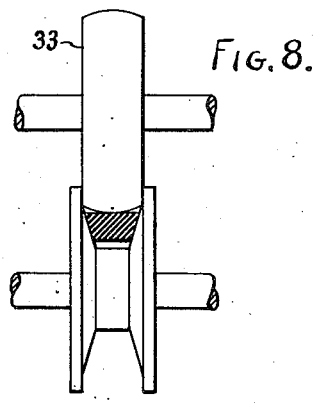
ABRAHAM L. FREEDLANDER, Inventor
Toulmin & Toulmin
Attorneys Dec. 17, 1935.  A. L. FREEDLANDER  2,024,443
BELT
Original Filed Feb. 12, 1934   4 Sheets-Sheet 3
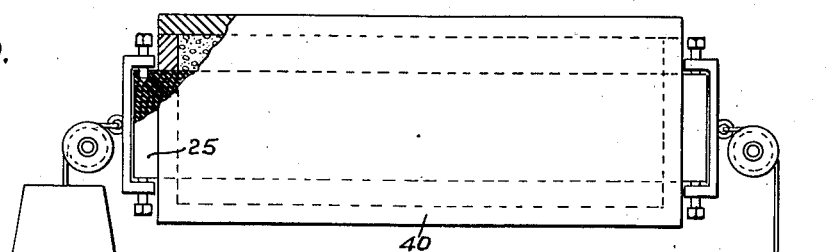
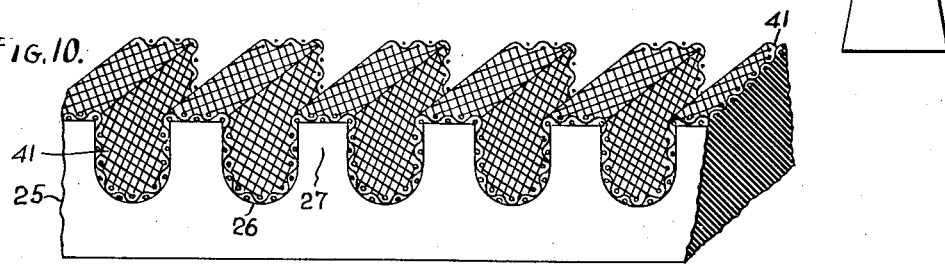
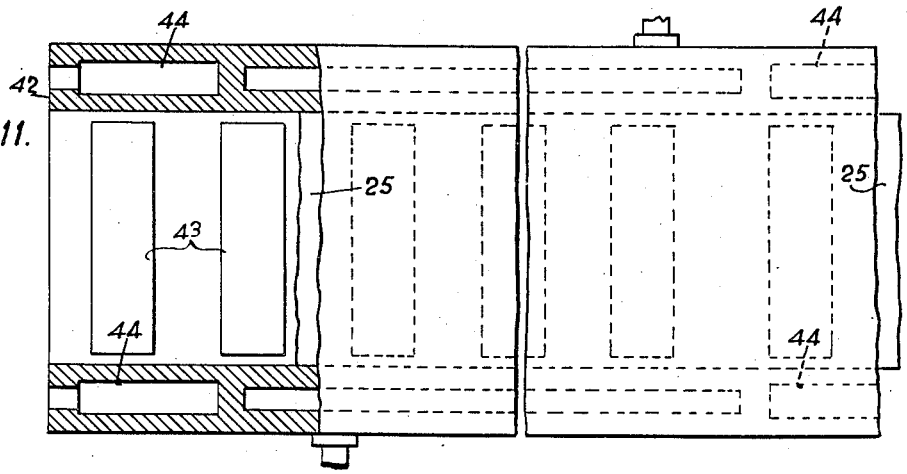
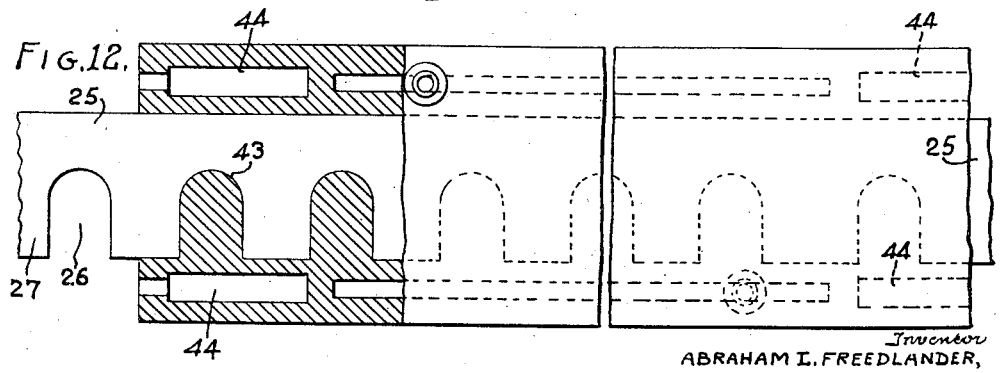
Inventor
ABRAHAM L. FREEDLANDER,
By
Toulmin & Toulmin
Attorneys

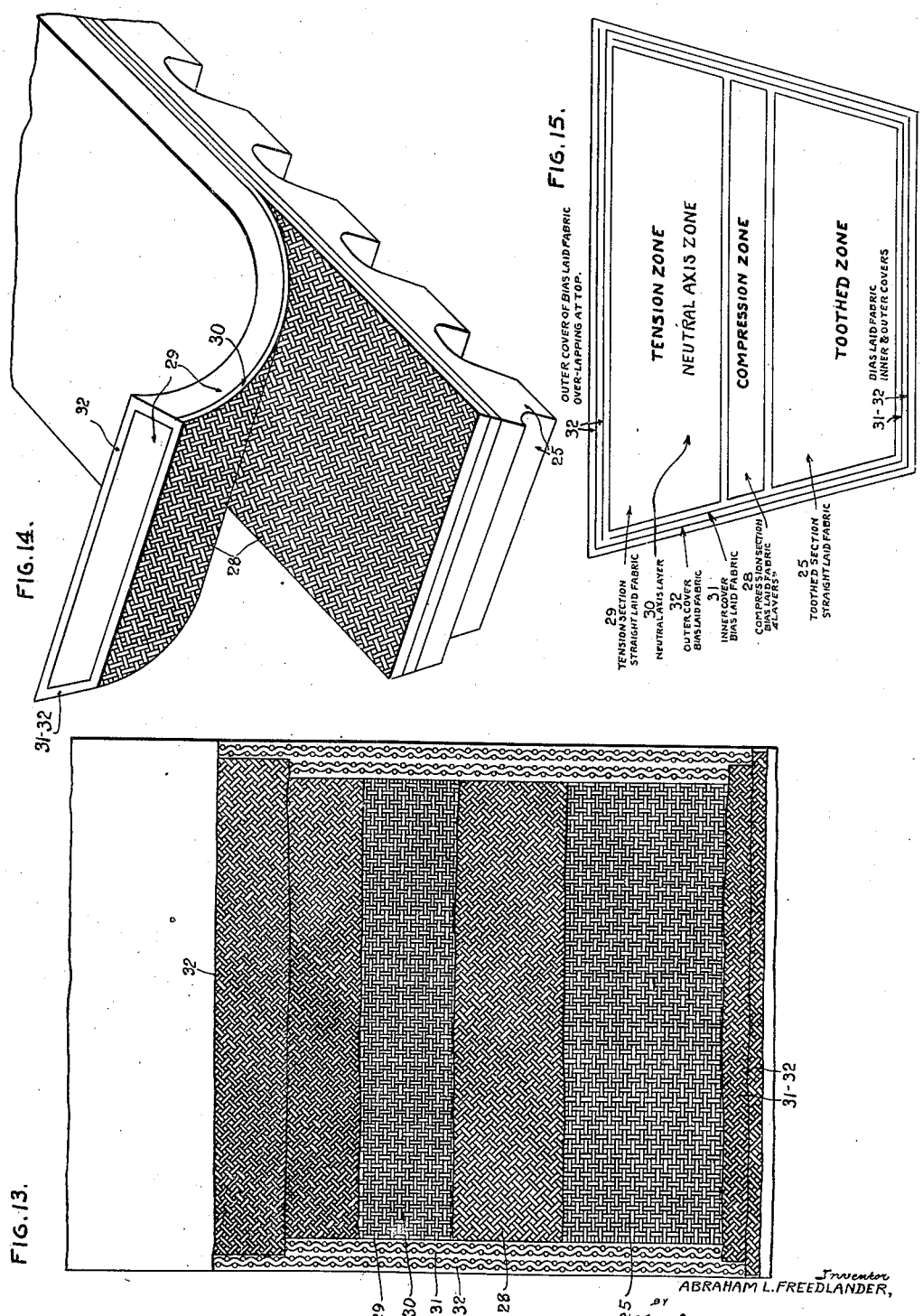

Patented Dec. 17, 1935

2,024,443

UNITED STATES PATENT OFFICE 2,024,443

BELT

Abraham L. Freedlander, Dayton, Ohio, assignor to The Dayton Rubber Manufacturing Company, Dayton, Ohio, a corporation of Ohio Original application February 12, 1934, Serial No. 710,821. Divided and this application September 4, 1934, Serial No. 742,572

11 Claims. (Cl. 74—233)

This invention relates to belts and especially to rubber-and-fabric belts.

One object of my invention is to provide a belt composed of groups of layers of rubberized fabric, each such group having different characteristics from those of the remaining groups.

Another object is to provide a belt wherein the fabric layers in one group are given different amounts of tension relative to one another while being laid together to form the group.

Another object is to provide a belt wherein the layers of fabric composing one group are laid with progressively-increasing tensions until the middle layer of the group is reached, and then with progressively-decreasing tensions until the outer layer on the other side of the group is reached.

Another object is to provide such a belt having an inner wrapper and an outer wrapper over the core, the two wrappers differing from one another in construction.

This application is a division of my application Ser. No. 710,821, filed Feb. 12, 1934.

In the drawings:

Figure 1 is a diagrammatic view of the apparatus for winding the layers of rubberized fabric upon one another in forming the core of the belt;

Figure 2 is a section through the winding drum shown in Figure 1, illustrating the groups of layers of rubberized fabric;

Figure 3 is a cross section through the belt showing the application of the inner wrapper or cover;

Figure 4 is a cross sectional view of the finished belt, shown in Figure 5, after the outer wrapper or cover has been applied to the construction of Figure 3;

Figure 5 is a side elevation of a section of the finished belt;

Figure 6 is a top plan view of the finished belt;

Figure 7 is a diagrammatic side elevation of the pre-forming apparatus;

Figure 8 is an end elevation of the apparatus shown in Figure 7;

Figure 9 is a side elevation, partly in section, showing the belt being frozen while in a stretched condition;

Figure 10 is a perspective view of the belt showing the application of the cover strip over the teeth;

Figure 11 is a diagrammatic plan view, partly broken away, of an open-ended toothed mould for curing the belt under tension;

Figure 12 is a side elevation, partly in section, of the mould shown in Figure 11;

Figure 13 is a top plan view of the belt of my invention with the layers thereof successively broken away to expose the underlying layers.

Figure 14 is a perspective view with the belt split longitudinally along one of the layers thereof and the top part raised to expose the fabric therein.

Figure 15 is a diagrammatic cross section illustrating the principles involved in the construction of my belt.

Method and apparatus for making the belt

Referring to the drawings in detail, Figure 1 shows a strip of rubberized fabric 1 which is rolled upon a spool 2. This rubberized fabric is composed of square-woven textile material which has been impregnated with soft vulcanizable rubber in a rubber mixing mill, generally a pair of rolls moving at different speeds. The sheet of fabric with the rubber mixed with it is then passed through a calender machine which forms the product into a sheet of rubberized fabric. This rubberized fabric is very sticky and will readily adhere to other layers of fabric and maintain the general form and shape given it despite the cutting or handling operations to which it is subjected.

The rubberized fabric strip 1 passes from the spool 2 over the guide rollers 3 and 4, across the stretching table 5, over the guide rollers 6 and 7, around the tension roller 8 and on to the forming cylinder 9. The latter is provided with an end plate 10 and a gear wheel 11 on the opposite side thereof (Figure 2). Both are attached to the shaft 12 as by the set screws 13. The cylinder 9 is provided with spokes 14 leading to hub portions 15 engaging the shaft 12. Accordingly by removing the end plates 10 and/or 11, the cylinder 9 may be removed from its driving apparatus.

The driving apparatus for the cylinder 9 (Figure 1) consists of an idler gear 17 meshing with the gear wheel 11 on the drum. On its opposite side, the idler gear 17 meshes with the gear 18 mounted on the shaft 19 of a suitable power source, such as an electric motor, generally designated 20. When the motor 20 revolves the shaft 19, the drum 9 is accordingly rotated and winds in the fabric strip 1 on to its periphery.

As hereinafter shown, the different layers of rubberized fabric are sometimes laid while under tension. To provide this tension, the roller 8 is mounted on a shaft 21 which is half supported in hanger 22. Its other half is engaged by a bearing block 23 which is forced against it by the screw 24 so as to apply any desired amount of friction to the shaft. By tightening the screw 24, the roller 8 is given an increasing amount of retardation, causing the fabric to be wound upon the drum 9 in a state of increasing tension. It will be understood that the fabric 1 does not slide on the tension roll 8, because of its extremely sticky condition.

In building up the core, the drum 9 is made of such diameter that its circumference somewhat exceeds the length of the belt to be produced. Its width is made of any convenient amount to produce the number of belt cores desired at one operation.

The innermost section 25 or first laid layers of rubberized fabric form the part of the belt which is cut away, as at 26 (Figure 5), to provide teeth 27 on the inner surface thereof. The tooth section 25 of rubberized fabric layers is formed by slowly revolving the drum 9 while a plurality of layers of rubberized square-woven fabric is wound upon it, without any tension upon the fabric, other than the slight tension naturally existing in feeding from the spool 2 to the cylinder 9. This fabric is straight-laid. In a 2" belt, for example, the tooth section 25 has about thirteen plies.

The tooth section fabric is then severed and the compression section layers 28 applied. These layers lie immediately above the tooth section 25 in the finished belt and are formed of a plurality of layers of the same rubberized fabric, but laid on the bias, and without tension. The bias-laid fabric enables the compression section of the belt to be compressed somewhat during the use of the belt without injury thereto. These plies lie just above the teeth in the finished belt and are applied on the bias so as to withstand the movement between the body of the belt and the teeth. In a 2" belt, about four plies of this bias-laid fabric are found suitable. The bias-laid fabric forming the compression section 28 of the belt is then severed and the neutral zone and tension section 29 laid over it.

These portions 29 and 30 of the belt are composed of the same square-woven rubberized fabric. This is straight-laid, but with varying amounts of tension between the different layers. It is found preferable to progressively increase the tension as each succeeding layer at the neutral zone is laid, until the middle layer is reached; and then to progressively decrease the tension until the outermost layer is reached. For example, in using seven plies or layers of tension, it is found suitable to give the first layer a stretch or tension per yard of approximately $\frac{5}{16}"$, the second layer $\frac{5}{8}"$, the third layer $1\frac{3}{8}"$, the fourth or middle layer $1\frac{1}{4}"$, the fifth layer $1\frac{3}{8}"$, the sixth layer $\frac{5}{8}"$ and the seventh layer $\frac{5}{16}"$. Thus the stretch or tension is varied in the different plies or layers according to their positions relative to the middle layer 30 or the neutral axis of the group. This middle layer 30 becomes the neutral axis layer of the finished belt.

With the final layer of the tension section 29 of the belt thus laid, the rubberized fabric is severed and the shell of rubberized material on the drum cut circumferentially into individual belt cores, each having the desired width and angle of side walls. Two lines are then drawn across the plurality of belts parallel to the axis of the drum, these lines being separated by a known peripheral distance, such as 36", for example. The cores are then removed from the drum by severing them with a knife passed longitudinally along the rim of the drum.

The belt cores are then given a coat of rubber cement and allowed to dry, during which operation they usually shrink slightly. The cores are then stretched out on a table until the two reference marks regain their original separation, such as 36", thus bringing the stretch of the belt back to the condition which it had when the belt core was built. During these steps, the mass of belt material forming the core maintains its general form because of the sticky nature of the rubberized fabric layers, of which it is composed, despite the fact that vulcanization has not yet taken place.

The belt core is now wrapped while it is stretched out on the table. The wrapper is applied to the belt in a stretched position so that it will not be strained during the subsequent stretching operations, and also because it promotes longer life in the belts while they are in use.

The wrapper assembly is composed of two parts (Figures 3 and 4), an inner cover 31 and an outer cover 32. Both covers are of bias-laid fabric, square-woven and rubberized. The inner cover extends around three sides only of the belt core, namely, the inner surface and side walls. The outside cover, however, fully encloses the belt core and the inner cover, and is lapped over itself for the entire width of the belt across the top thereof. After the covers have been applied, they are rolled down into place.

The belt thus covered is now run through the pre-forming machine (Figures 7 and 8) in order to form it more nearly to its final shape. The pre-forming machine is in its essence a pair of rollers 33 and 34. The lower roll 34 is provided with a peripheral groove 35 which has the approximate shape of the belt cross section: this roll is power driven. The upper roll 33, however, has a slightly convex periphery and is driven by the friction of the belt passing underneath. The pressure of the upper roll 33 forces the belt downward into the groove and causes it to take on the cross sectional shape thereof.

After the pre-forming operation has been completed the belt is stretched out and clamped in its stretched position in a trough 40. In the belt considered as an example, it has been found that $1\frac{1}{2}"$ of stretch per yard is satisfactory, so that the two marks which were originally 36" apart are now $37\frac{1}{2}"$ apart. The stretched belt is now surrounded by solidified carbon dioxide, commonly known as "dry ice", and allowed to freeze for approximately twenty minutes. The clamps are now removed but the belt retains its stretched length because of its being frozen. The frozen belt is immediately put through the punch press which punches out the cut-away portions 26 to form the teeth 27. The punch press die is provided with a plunger-locating device which causes the teeth to be properly spaced. While the belt is being punched, it thaws out and consequently shrinks. In the belt considered as an example, this shrinkage amounts to about $2\frac{1}{2}"$ per yard, or an eventual length of 35" for the belt which was previously stretched to $37\frac{1}{2}"$. The teeth 27 and the cut-away portions 26 are now provided with a bias-laid rubberized fabric cover strip 41 cemented thereto, in order to protect the surface thereof.

The belt is now cured in an open-ended mould 42. This mould is provided with toothed portions 43 which are spaced apart from one another by an amount which is greater than the separation of the teeth in the finished belt. One end of the belt is fitted into the teeth in the mould and the other end is stretched by means of a cable and windlass until the teeth on the belt are stretched out sufficiently to fit into the toothed portions 43 in the mould 42. When the belt is in the mould, the two marks which were originally about 36″ apart are now 37″ apart. The mould is approximately thirteen feet long and is provided with water-cooling portions 44 at each end. These water-cooling portions are used to prevent an over-curing of the belt, where the latter is of such length that it must be cured more than once. In the belt considered as an example, this curing then is about sixty-five minutes at about 286 degrees Fahrenheit.

After curing, the belt is removed from the mould. It now shrinks somewhat as it cools, the belt under consideration having an eventual length of about 36½″ between the marks. The belt is now trimmed, if necessary, to remove projecting parts or excessive size and thus reaches its finished state.

The finished belt, briefly described, thus consists of a core having a toothed portion 25 with teeth 27 cut thereon by removing the cut-away portions 26 therefrom; a compression section 28 which is adapted to be compressed slightly as the belt passes around pulleys; a tension section 29 having the fabric layers of graduated tension previously described and containing the neutral axis layer 30 of the belt; an inner cover 31 surrounding three sides of the belt; an outer cover 32 surrounding four sides of the belt; and a tooth cover 41 covering the teeth 27 and the cut-away portions 26 on the inner surface thereof. The belt of my invention is thus adapted, because of its construction as above disclosed, to maintain a substantially constant length along its neutral axis, despite conditions of intensive use.

It will be understood that I desire to comprehend within my invention such modifications as may be necessary to adapt it to varying conditions and uses.

Having thus fully described my invention, what I claim as new and desire to secure by Letters Patent is:

1. A belt comprising a plurality of layers of rubberized fabric arranged in groups, one group having straight-laid layers arranged without tension, another group having bias-laid layers arranged without tension, and a third group having layers arranged at varying tensions relative to one another.

2. A belt comprising a plurality of layers of rubberized fabric arranged in groups, one group having straight-laid layers arranged without tension, another group having bias-laid layers arranged without tension, and a third group having straight-laid layers arranged at varying tensions relative to one another.

3. A belt comprising a plurality of layers of rubberized fabric arranged in groups, one group having straight-laid layers arranged without tension, another group having bias-laid layers arranged without tension, and a third group having straight-laid layers arranged at varying tensions relative to one another, said first-mentioned group having toothed portions formed therein.

4. In combination in a belt of a plurality of inner layers of rubberized fabric arranged without tension, a plurality of superimposed layers arranged with progressively increasing tension, and a plurality of superimposed layers of progressively decreasing tension, said belt being so arranged that the zone of maximum tension substantially coincides with the neutral axis of the belt.

5. In combination in a belt of a plurality of inner layers of rubberized fabric arranged without tension, a plurality of superimposed layers arranged with progressively increasing tension, and a plurality of superimposed layers of progressively decreasing tension, said belt being so arranged that the zone of maximum tension substantially coincides with the neutral axis of the belt, said first mentioned layer having sections sheared therefrom transversely of the belt to form a plurality of transversely arranged teeth on the inner surface of the belt.

6. In combination in a belt, a plurality of straight laid layers of rubberized fabric arranged without tension, a plurality of superimposed layers of bias laid rubberized fabric without tension, a plurality of straight laid layers of rubberized fabric under tension and increasing progressively in tension from the bottom to the top of the layers, a second group of layers of rubberized straight laid fabric under tension progressively decreasing in tension from the bottom of the layers to the top, said region of maximum tension of the last two groups of layers being substantially in the neutral axis of the belt.

7. In combination in a belt, a plurality of straight laid layers of rubberized fabric arranged without tension, a plurality of superimposed layers of bias laid rubberized fabric without tension, a plurality of straight laid layers of rubberized fabric under tension and increasing progressively in tension from the bottom to the top of the layers, a second group of layers of rubberized straight laid fabric under tension progressively decreasing in tension from the bottom of the layers to the top, said region of maximum tension of the last two groups of layers being substantially in the neutral axis of the belt, said first mentioned group of layers having portions thereof sheared transversely of the belt to form teeth on the inner surface of the belt.

8. In combination in a belt, a plurality of straight laid layers of rubberized fabric arranged without tension, a plurality of superimposed layers of bias laid rubberized fabric without tension, a plurality of straight laid layers of rubberized fabric under tension and increasing progressively in tension from the bottom to the top of the layers, a second group of layers of rubberized straight laid fabric under tension progressively decreasing in tension from the bottom of the layers to the top, said region of maximum tension of the last two groups of layers being substantially in the neutral axis of the belt, said first mentioned group of layers having portions thereof sheared transversely of the belt to form teeth on the inner surface of the belt, and an inner cover layer mounted on the inner face of said belt over said teeth comprising rubberized fabric.

9. In combination in a belt of a plurality of inner layers of rubberized fabric arranged without tension, a plurality of superimposed layers arranged with progressively increasing tension, and a plurality of superimposed layers of progressively decreasing tension, said belt being so arranged that the zone of maximum tension substantially coincides with the neutral axis of the belt, and a cover of rubberized fabric for the bottom and side walls of said belt, and a second cover of rubberized fabric for the bottom, side walls and top of said belt.

10. In combination in a belt of a plurality of inner layers of rubberized fabric arranged without tension, a plurality of superimposed layers arranged with progressively increasing tension, and a plurality of superimposed layers of progressively decreasing tension, said belt being so arranged that the zone of maximum tension substantially coincides with the neutral axis of the belt, said first mentioned layer having sections sheared therefrom transversely of the belt to form a plurality of transversely arranged teeth on the inner surface of the belt, a cover of rubberized fabric for the bottom and side walls of said belt, and a second cover of rubberized fabric for the bottom, side walls and top of said belt.

11. In combination in a belt, a plurality of straight laid layers of rubberized fabric arranged without tension, a plurality of superimposed layers of bias laid rubberized fabric without tension, a plurality of straight laid layers of rubberized fabric under tension and increasing progressively in tension from the bottom to the top of the layers, a second group of layers of rubberized straight laid fabric under tension progressively decreasing in tension from the bottom of the layers to the top, said region of maximum tension of the last two groups of layers being substantially in the neutral axis of the belt, a cover of rubberized fabric for the bottom and side walls of said belt, and a second cover of rubberized fabric for the bottom, side walls and top of said belt.

ABRAHAM L. FREEDLANDER.